United States Patent
Samprathi et al.

(10) Patent No.: US 10,698,716 B2
(45) Date of Patent: Jun. 30, 2020

(54) VIRTUAL MACHINE STATE RECORDER

(71) Applicant: Nutanix, Inc., San Jose, CA (US)

(72) Inventors: Ravikanth Samprathi, San Jose, CA (US); Srinivas Bandi Ramesh Babu, Mountain View, CA (US); Thomas Hill, Foster City, CA (US); Aroosh Sohi, San Jose, CA (US)

(73) Assignee: NUTANIX, INC., San Jose, CA (US)

( * ) Notice: Subject to any disclaimer, the term of this patent is extended or adjusted under 35 U.S.C. 154(b) by 159 days.

(21) Appl. No.: 15/921,990

(22) Filed: Mar. 15, 2018

(65) Prior Publication Data
US 2019/0286464 A1   Sep. 19, 2019

(51) Int. Cl.
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |
| 2011/0238969 A1* | 9/2011 | Warkentin | G06F 9/441 713/2 |
| 2014/0223126 A1* | 8/2014 | Ye | G06F 11/1438 711/162 |

OTHER PUBLICATIONS

Poitras, Steven. "The Nutanix Bible" (Jan. 11, 2014), from stevenpoitras.com/the-nutanix-bible/ (Publication date based on indicated capture date by Archive.org; first publication date unknown).
Poitras, Steven. "The Nutanix Bible" (Jan. 12, 2016), from nutanixbible.com/.

(Continued)

*Primary Examiner* — Eric C Wai
(74) *Attorney, Agent, or Firm* — Foley & Lardner LLP

(57) ABSTRACT

Disclosed herein are related to a method, a system, and a non-transitory computer readable medium for backing up a virtual machine. In one aspect, an instruction to store a requested state of a virtual machine is received. Configurations of the virtual machine in the requested state are determined, and a configuration data indicative of the determined configurations of the virtual machine is generated. The configuration data is stored. Another instruction to load the virtual machine in the requested state from a plurality of states of the virtual machine may be received. The stored configuration data indicative of the configurations of the virtual machine in the requested state may be retrieved. The configurations of the virtual machine in the requested state may be identified based on the retrieved configuration data, and the virtual machine in the requested state may be loaded according to the identified configurations.

22 Claims, 8 Drawing Sheets

(56) References Cited

OTHER PUBLICATIONS

Poitras, Steven. "The Nutanix Bible" (Oct. 15, 2013), from stevenpoitras.com/the-nutanix-bible/ (Publication date based on indicated capture date by Archive.org; first publication date unknown).
Poitras, Steven. "The Nutanix Bible" (Jun. 20, 2014), from stevenpoitras.com/the-nutanix-bible/ (Publication date based on indicated capture date by Archive.org; first publication date unknown).
Poitras, Steven. "The Nutanix Bible" (Jan. 3, 2017), from nutanixbible.com/.
Poitras, Steven. "The Nutanix Bible" (Sep. 4, 2015), from nutanixbible.com/.
Poitras, Steven. "The Nutanix Bible" (Jan. 7, 2015), from stevenpoitras.com/the-nutanix-bible/ (Publication date based on indicated capture date by Archive.org; first publication date unknown).
Poitras, Steven. "The Nutanix Bible" (Jun. 9, 2015), from stevenpoitras.com/the-nutanix-bible/ (Publication date based on indicated capture date by Archive.org; first publication date unknown).
Poitras, Steven. "The Nutanix Bible" (Jun. 9, 2016), from nutanixbible.com/.
Poitras, Steven. "The Nutanix Bible" (Jun. 8, 2017), from nutanixbible.com/.
Poitras, Steven. "The Nutanix Bible" (Jan. 3, 2018), from nutanixbible.com/.
Cano, Ignacio, et al. "Curator: Self-Managing Storage for Enterprise Clusters" (Mar. 27, 2017), from www.usenix.org/conference/nsdi17/.

* cited by examiner

VIRTUAL MACHINE STATE RECORDER

BACKGROUND

The following description is provided to assist the understanding of the reader. None of the information provided or references cited is admitted to be prior art.

Virtual computing systems are widely used in a variety of applications. Virtual computing systems include one or more host machines running one or more virtual machines. The one or more virtual machines utilize the hardware resources of the underlying one or more host machines. Each virtual machine may be configured to run an instance of an operating system.

Running a virtual machine includes setting various hardware and software configurations of a host machine. For example, an operating system version, virtual machine image, network configuration, security configuration, metadata, storage configuration, etc. are configured to load a virtual machine. However, determining various configurations of the virtual machine may be time consuming and inefficient in terms of hardware resources (e.g., processor and storage resource). As a result, running a virtual machine on different host machines may be discouraged due to long delay and inefficient usage of hardware resources to configure virtual machine on different host machines.

SUMMARY

Various embodiments disclosed herein are related to a method, a system, and a non-transitory computer readable medium for storing a state of a virtual machine. In various embodiments, an instruction to store a requested state of a virtual machine is received. Configurations of the virtual machine in the requested state may be determined. A configuration data indicative of the determined configurations of the virtual machine is generated, and the configuration data is stored.

In one or more embodiments, the requested state of the virtual machine is a state of the virtual machine, at which a user requested to save the state of the virtual machine.

In one or more embodiments, the requested state of the virtual machine is a state of the virtual machine, at which the virtual machine periodically saves the state of the virtual machine.

In one or more embodiments, the requested state of the virtual machine is a target state of the virtual machine at a first time, the target state of the virtual machine determined at a second time before the first time. A user input specifying the target state of the virtual machine at the first time may be received, and the configurations of the virtual machine may be determined based on the user input.

In one or more embodiments, another instruction to load the virtual machine in the requested state from a plurality of states of the virtual machine is received. The stored configuration data indicative of the configurations of the virtual machine in the requested state may be received. The configurations of the virtual machine in the requested state may be identified based on the retrieved configuration data. The virtual machine in the requested state may be loaded according to the identified configurations. Said another instruction may be generated in response to a user selection of the requested state of the virtual machine from the plurality of states.

Figure 1:
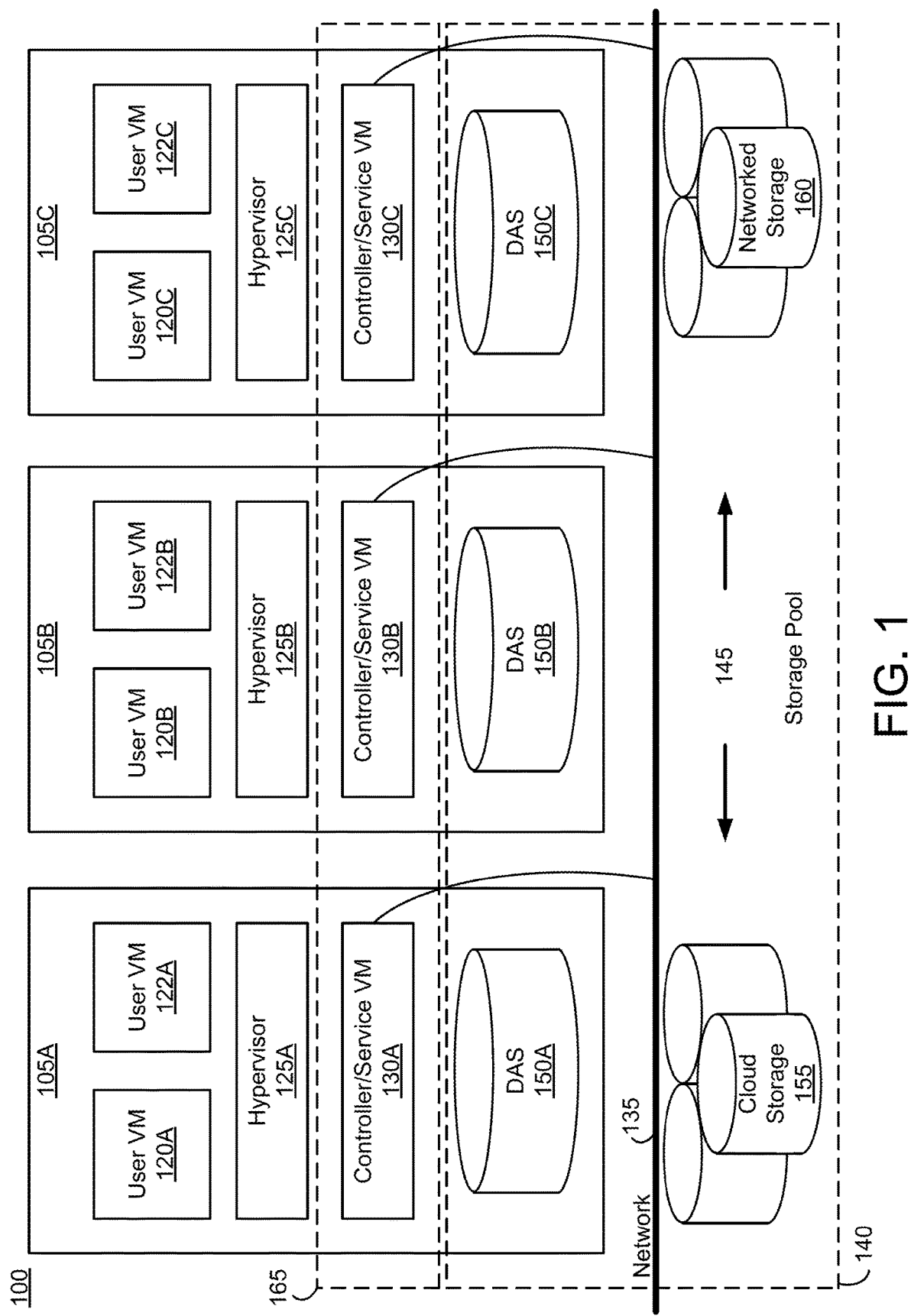
FIG. 1 is a block diagram of a virtual computing system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Disclosed herein are related to a method, a system, and a non-transitory computer readable medium for backing up a virtual machine (VM). In some embodiments, an instruction to store a requested state of a VM is received. A state of a VM indicates configurations of the VM at a corresponding time. Examples of configurations of a VM include an operating system version, VM image, network configuration, security configuration, metadata, storage configuration, etc. For example, the VM may be in a first state with a first set of configurations at a first time, and may be in a second state with a second set of configurations at a second time. A state of a VM may be requested to be stored in response to a user request, or may be periodically stored. In one aspect, a future state of a VM with a user specified set of configurations at a trigger time may be requested to be stored. The trigger time may be after a time, at which a user specifies a set of configurations of the VM in the future state. Configurations of the VM in the requested state are determined, and a configuration data indicative of the determined configurations of the VM is generated. The configuration data is stored, for example, on a distributed database.

In one or more embodiments, another instruction to load the VM in the requested state from a plurality of states of the VM is received. Said another instruction may be generated to load the VM with a latest state of the VM stored, or may be generated to load the VM with a specific state requested by the user. Alternatively, said another instruction may be generated to load the VM in the future state in response to a trigger time associated with the future state has reached. The stored configuration data indicative of the configurations of the VM in the requested state may be retrieved. The configurations of the VM in the requested state may be identified based on the retrieved configuration data. The VM in the requested state may be loaded according to the identified configurations.

Advantageously, disclosed method or system herein enables a VM to be loaded on different host machines in an efficient manner. Specifically, without determining various hardware and software configurations to operate the VM, a configuration data indicating configurations of the VM can be retrieved to load the VM. By retrieving the configuration data, the VM may be loaded by any host machines in a seamless manner.

Moreover, a state from a plurality of states can be selected and a VM can be loaded in the selected state. The plurality of states may include any previous states of the VM and a future state with a user specified configurations of the VM. By selecting a state of the VM to load, a VM in a previous state may be restored or a VM in a user defined state may be loaded at a time (e.g., trigger time) defined by the user. Thus, a VM may be loaded in different states associated with corresponding times according to a user selection.

Referring now to FIG. 1, a virtual computing system 100 is shown, in accordance with some embodiments of the present disclosure. The virtual computing system 100 includes a plurality of nodes 105A, 105B, 105C. Each of the nodes 105A, 105B, 105C includes user virtual machines (VMs) 120, 122, and a hypervisor 125 configured to create and run the user VMs. Each of the nodes 105 also includes a controller/service VM 130 that is configured to manage, route, and otherwise handle workflow requests to and from the user VMs 120 of a particular node. The controller/service VM 130 is connected to a network 135 to facilitate communication between the nodes 105. Although not shown, in some embodiments, the hypervisor 125 may also be connected to the network 135. In other embodiments, each node 105 includes more, fewer or different components than shown in FIG. 1. For example, the node 105 includes a single VM, or any number of VMs.

The virtual computing system 100 may also include a storage pool 140. The storage pool 140 may include network-attached storage 145 and direct-attached storage 150. The network-attached storage 145 may be accessible via the network 135 and, in some embodiments, may include cloud storage 155, as well as local storage area network 160. In contrast to the network-attached storage 145, which is accessible via the network 135, the direct-attached storage 150 may include storage components that are provided within each of the nodes 105, such that each of the nodes 105 may access its respective direct-attached storage 150 without having to access the network 135.

It is to be understood that certain components of the virtual computing system 100 are shown in FIG. 1. Nevertheless, several other components that are commonly provided or desired in a virtual computing system are contemplated and considered within the scope of the present disclosure. Additional features of the virtual computing system 100 are described in U.S. Pat. No. 8,601,473, which is incorporated by reference herein in its entirety.

Although three of the plurality of nodes 105A, 105B, 105C are shown in the virtual computing system 100, in other embodiments, greater than or fewer than three nodes may be employed. Likewise, although two of the user VMs 120, 122 are shown on each of the nodes 105, in other embodiments, the number of the user VMs on any of the nodes 105 may vary to include either a single user VM or more than two user VMs. Further, the nodes 105 may have different number of the user VMs 120, 122. Additionally, more than a single instance of the hypervisor 125 and/or the controller/service VM 130 may be provided on one or more of the nodes 105A, 105B, 105C.

In some embodiments, each of the nodes 105A, 105B, 105C may be a hardware device, such as a server. For example, in some embodiments, one or more of the nodes 105A, 105B, 105C may be an NX-1000 server, NX-3000 server, NX-6000 server, NX-8000 server, etc., provided by Nutanix, Inc. or server computers from Dell, Inc., Lenovo Group Ltd. or Lenovo PC International, Cisco Systems, Inc., etc. In other embodiments, one or more of the nodes 105A, 105B, 105C may be another type of hardware device, such as a personal computer, an input/output or peripheral unit such as a printer, or any type of device that is suitable for use as a node within the virtual computing system 100. In some embodiments, the virtual computing system 100 may be part of a data center.

Each of the nodes 105A, 105B, 105C may also be configured to communicate and share resources with each other via the network 135. For example, in some embodiments, the nodes 105A, 105B, 105C may communicate and share resources with each other via the controller/service VM 130 and/or the hypervisor 125. One or more of the nodes 105A, 105B, 105C may also be organized in a variety of network topologies, and may be termed as a "host" or "host machine."

Also, although not shown, one or more of the nodes 105A, 105B, 105C may include one or more processing units configured to execute instructions. The instructions may be carried out by a special purpose computer, logic circuits, or hardware circuits of the nodes 105A, 105B, 105C. The processing units may be implemented in hardware, firmware, software, or any combination thereof. The term "execution" is, for example, the process of running an application or the carrying out of the operation called for by an instruction. The instructions may be written using one or more programming language, scripting language, assembly language, etc. The processing units, thus, execute an instruction, meaning that they perform the operations called for by that instruction.

The processing units may be operably coupled to the storage pool 140, as well as with other elements of the respective nodes 105 to receive, send, and process information, and to control the operations of the underlying first, second, or third node. The processing units may retrieve a set of instructions from the storage pool 140, such as, from a permanent memory device like a read only memory (ROM) device and copy the instructions in an executable form to a temporary memory device that is generally some form of random access memory (RAM). The ROM and RAM may both be part of the storage pool 140, or in some embodiments, may be separately provisioned from the storage pool. Further, the processing units may include a single stand-alone processing unit, or a plurality of processing units that use the same or different processing technology.

With respect to the storage pool 140 and particularly with respect to the direct-attached storage 150, it may include a variety of types of memory devices. For example, in some embodiments, the direct-attached storage 150 may include, but is not limited to, any type of RAM, ROM, flash memory, magnetic storage devices (e.g., hard disk, floppy disk, magnetic strips, etc.), optical disks (e.g., compact disk (CD), digital versatile disk (DVD), etc.), smart cards, solid state devices, etc. Likewise, the network-attached storage 145 may include any of a variety of network accessible storage (e.g., the cloud storage 155, the local storage area network 160, etc.) that is suitable for use within the virtual computing system 100 and accessible via the network 135. The storage pool 140 including the network-attached storage 145 and the direct-attached storage 150 may together form a distributed storage system configured to be accessed by each of the nodes 105 via the network 135 and the controller/service VM 130, and/or the hypervisor 125. In some embodiments, the various storage components in the storage pool 140 may be configured as virtual disks for access by the user VMs 120.

Each of the user VMs 120 is a software-based implementation of a computing machine in the virtual computing system 100. The user VMs 120 emulate the functionality of a physical computer. Specifically, the hardware resources, such as processing unit, memory, storage, etc., of the underlying computer (e.g., the nodes 105) are virtualized or transformed by the hypervisor 125 into the underlying support for each of the plurality of user VMs 120 that may run its own operating system and applications on the underlying physical resources just like a real computer. By encapsulating an entire machine, including CPU, memory, operating system, storage devices, and network devices, the user VMs 120 are compatible with most standard operating systems (e.g. Windows, Linux, etc.), applications, and device drivers. Thus, the hypervisor 125 is a virtual machine monitor that allows a single physical server computer (e.g., the nodes 105) to run multiple instances of the user VMs 120, with each user VM sharing the resources of that one physical server computer, potentially across multiple environments. By running the plurality of user VMs 120 on each of the nodes 105, multiple workloads and multiple operating systems may be run on a single piece of underlying hardware computer (e.g., the nodes 105) to increase resource utilization and manage workflow.

The user VMs 120 are controlled and managed by the controller/service VM 130. The controller/service VM 130 of each of the nodes 105 is configured to communicate with each other via the network 135 to form a distributed system 165. The hypervisor 125 of each of the nodes 105 may be configured to run virtualization software, such as, ESXi from VMWare, AHV from Nutanix, Inc., XenServer from Citrix Systems, Inc., etc., for running the user VMs 120 and for managing the interactions between the user VMs and the underlying hardware of the nodes 105. The controller/service VM 130 and the hypervisor 125 may be configured as suitable for use within the virtual computing system 100.

The network 135 may include any of a variety of wired or wireless network channels that may be suitable for use within the virtual computing system 100. For example, in some embodiments, the network 135 may include wired connections, such as an Ethernet connection, one or more twisted pair wires, coaxial cables, fiber optic cables, etc. In other embodiments, the network 135 may include wireless connections, such as microwaves, infrared waves, radio waves, spread spectrum technologies, satellites, etc. The network 135 may also be configured to communicate with another device using cellular networks, local area networks, wide area networks, the Internet, etc. In some embodiments, the network 135 may include a combination of wired and wireless communications.

In some embodiments, one of the nodes 105 may be configured as a leader node. The leader node may be configured to monitor and handle requests from other nodes in the virtual computing system 100. If the leader node fails, another leader node may be designated. Furthermore, one or more of the nodes 105 may be combined together to form a network cluster (also referred to herein as simply "cluster"). Generally speaking, all of the nodes 105 in the virtual computing system 100 may be divided into one or more clusters. One or more components of the storage pool 140 may be part of the cluster as well. For example, the virtual computing system 100 as shown in FIG. 1 may form one cluster in some embodiments. Multiple clusters may exist within a given virtual computing system (e.g., the virtual computing system 100). The user VMs 120 that are part of a cluster may be configured to share resources with each other. In some embodiments, multiple clusters may share resources with one another.

Further, as shown herein, one or more of the user VMs 120 may be configured to have a search computing system. In some embodiments, the search computing system may be provided on one or more of the user VMs 120 of the leader node, while in other embodiments, the search computing system may be provided on another node. In some embodiments, the search computing system may be provided on a user virtual machine that is separate from but associated with the user VMs 120. For example, in some embodiments, the search computing system may be provided on a user virtual machine that is configured to manage the various clusters and elements within the various clusters of the virtual computing system 100. In some embodiments, the search computing system may reside on the controller/service VM 130. Thus, the search computing system may be configured to reside on a variety of components within the virtual computing system 100 as desired.

In one or more embodiments, the virtual computing system 100 may operate as a consolidated cloud system to access the resources (e.g., storage, processing unit, etc.) of different cloud systems (or different cloud storage). The cloud storage 155 or one or more of the nodes 105 may be operated by different cloud service providers. For example, a cloud storage 155 may be AWS S3 data storage from AMAZON, OnMetal data storage from Rackspace, Azure database from StorSimple, Google cloud storage from Google, Xi cloud storage from Nutanix, etc. Different cloud systems may be optimized for different characteristics. For example, one cloud system may be more efficient for SQL database, where another cloud system may be more efficient in terms of cost per storage, and another cloud system may be more efficient in terms of operation speed.

In some embodiments, the virtual computing system 100 allows a state of a virtual machine associated with a corresponding time to be stored. For example, a user operating the virtual machine may manually request to save a state of a virtual machine for a time, at which the user provides the request, and the virtual computing system 100 may generate an instruction to store the requested state of the virtual machine. For another example, the virtual computing system 100 periodically generates an instruction to store the state of the virtual machine. The virtual computing system 100 may generate configuration data indicating configurations of a virtual machine in the state.

In some embodiments, the virtual computing system 100 allows the virtual machine to change its state. For example, the virtual computing system 100 may provide a user interface with different states of a virtual machine associated with corresponding times, and receive a user request to load the virtual machine in a state selected by the user. The virtual computing system 100 may retrieve configuration data of the virtual machine in the requested state, and load the virtual machine according to configurations of the virtual machine indicated in the configuration data. Hence, the virtual computing system 100 enables a user to configure the virtual machine in the selected state.

In some embodiments, the virtual computing system 100 allows a future state of the virtual machine to be determined. In one example, a user operating the virtual machine or a person managing the virtual computing system 100 may manually request to save a future state of a virtual machine for a trigger time. A trigger time may be after the time, at which the user provides the request. In one example approach, a user may specify a particular security policy or a network configuration to be applied to a virtual machine a certain time after (e.g., three hours later) or after a specified target date (e.g., after 2018 Jan. 1 at 1:00 AM). The virtual computing system 100 may generate configuration data indicating configurations of a virtual machine in the future state. Upon receiving an instruction to load the virtual machine in the future state, the virtual computing system 100 may obtain the configuration data of the virtual machine in the future state and load the virtual machine according to configurations of the virtual machine specified by the configuration data.

Figure 2:
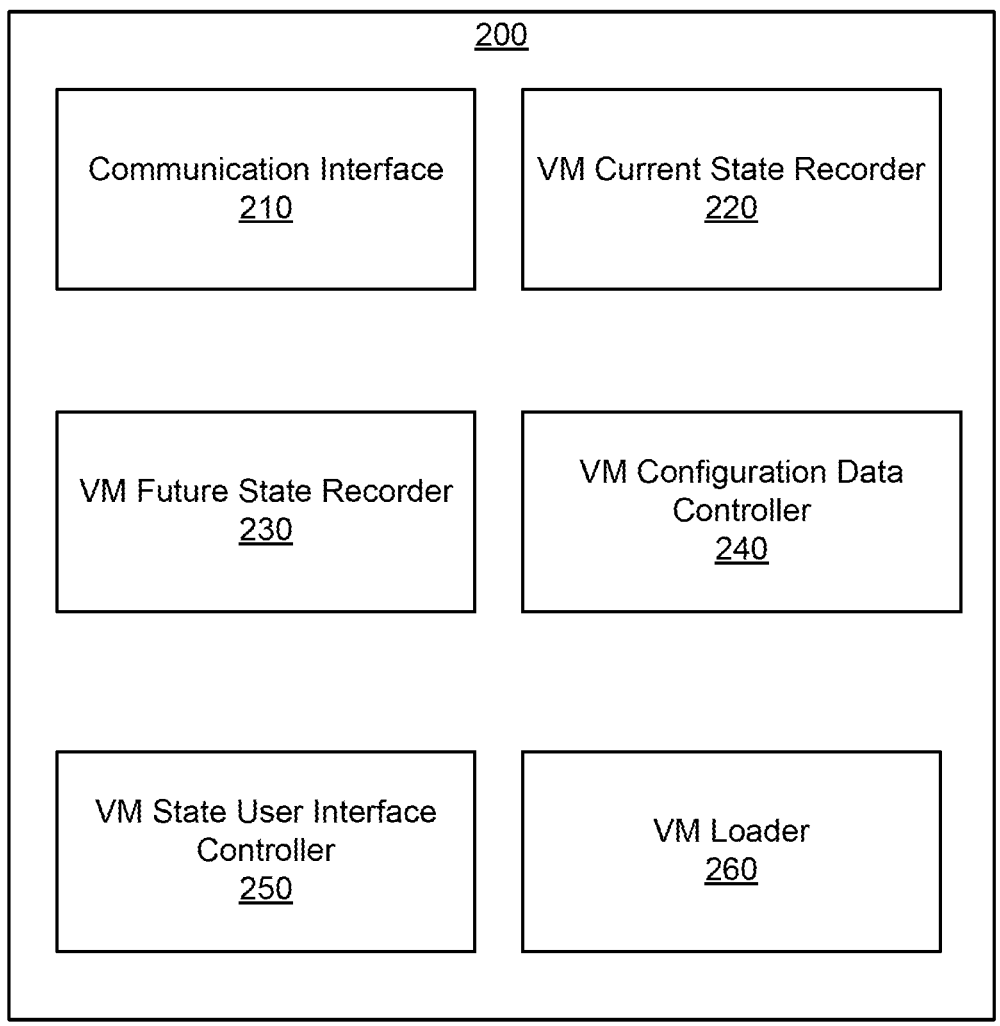
FIG. 2 is a block diagram of a virtual machine server, in accordance with some embodiments of the present disclosure.

Referring to FIG. 2, illustrated is a block diagram of an example VM server 200, in accordance with some embodiments of the present disclosure. In some embodiments, the VM server 200 includes a communication interface 210, a VM current state recorder 220, a VM future state recorder 230, a VM configuration data controller 240, a VM state user interface controller 250, and a VM loader 260. These components operate together to store states of a VM and load the VM in one of the states. These components may be embodied as hardware, software, or a combination thereof. The VM server 200 may be embodied as one of the components (e.g., user VM, 120, hypervisor 125, controller service VM 130, or a combination of them) of a node 105. In some embodiments, the VM server 200 includes more, fewer, or different components than shown in FIG. 2. In some embodiments, some of the functionalities of the VM server 200 may be distributed across different components within a node 105 or distributed across different nodes 105.

The communication interface 210 is a component that interfaces the network 135. The communication interface 210 may receive instructions, commands, or data from an external device (e.g., a user device such as a node 105 or a storage such as a cloud storage 155 or a networked storage 160), and forwards the received instructions, commands, or data to various components within the VM server 200. Moreover, the communication interface 210 receives instructions, commands, or data from various components within the VM server 200, and forwards the instructions, commands, or data to corresponding external devices.

The VM current state recorder 220 is a component that generates configuration data indicating configurations of a VM when an instruction to store the state of the VM is received. The VM current state recorder 220 may receive an instruction or command through the VM state user interface controller 250 to save a state of a VM for a time, at which the user provides the request. In response to the instruction or the command, the VM current state recorder 220 may determine configurations of the VM at the time the instruction or the command is received, and generate configuration data indicating the determined configurations and time of the configurations. Additionally or alternatively, the VM current state recorder 220 periodically generates an instruction or command to save a state of a VM. In response to the instruction to save a state of a VM at a time, the VM current state recorder 220 may determine configurations of the VM at the time the instruction or the command is received, and generate configuration data indicating the determined configurations and the time of the configurations. The VM current state recorder 220 may provide the configuration data to the VM configuration data controller 240 to store the configuration data.

The VM future state recorder 230 is a component that generates configuration data indicating configurations of a VM when a trigger time has satisfied. A trigger time may be after the time, at which the user provides the request. The VM future state recorder 230 may receive a user request to store a future state of a VM through the VM state user interface controller 250. The user may specify, through the VM state user interface controller 250, a trigger time, and desired configurations of the VM at or after the trigger time. For example, a user may specify a particular security policy or a network configuration to be applied to a VM a certain time later or after a specified target date. The VM future state recorder 230 may generate configuration data indicating the configurations of the VM and the trigger time as specified by the user. The VM future state recorder 230 may provide the configuration data to the VM configuration data controller 240 to store the configuration data.

The VM configuration data controller 240 is a component that stores the configuration data. The VM configuration data controller 240 may receive configuration data of a VM for a corresponding time, and store the received configuration data at the cloud storage 155, the networked storage 160, or both. In one approach, the VM configuration data controller 240 stores the configuration data at a distributed database. The VM configuration data controller 240 may also receive a request from the VM loader 260 to retrieve a configuration data of a VM in a particular state or for particular time duration, and provide the configuration data to the VM loader 260.

The VM state user interface controller 250 is a component that provides a user interface for storing a state of a VM or loading the virtual state. In one aspect, the VM state user interface controller 250 provides a user interface that allows a user to store a state including configurations of a VM at a selected time. The VM state user interface controller 250 may also provide a user interface that allows a user to specify a periodicity (e.g., every 6 hours) of the VM current state recorder 220 to store a state of the VM. Moreover, the VM state user interface controller 250 may also provide a user interface that allows a user to specify a trigger time in the future and a future state of a VM. The VM state user interface controller 250 may generate an instruction for the VM current state recorder 220 or the VM future state recorder 230 to generate configuration data of the VM. Furthermore, the VM state user interface controller 250 presents a plurality of states of a VM stored, and allows a user to select a state of the VM to be loaded. The VM state user interface controller 250 may provide an instruction or a request to retrieve configuration data of the VM in the requested state to the VM configuration data controller 240. Examples of user interface generated by the VM state user interface controller 250 are provided below with respect to FIGS. 3A through 3C.

The VM loader 260 is a component that receives configuration data from the VM configuration data controller 240 and loads the VM according to configurations of the VM specified by the configuration data. In response to a request to load a VM in a requested state, the VM loader 260 retrieves configuration data from the VM configuration data controller 240 and loads the VM in the requested state according to configurations of the VM specified by the configuration data. If a VM is booting without a specific request, the VM loader 260 may retrieve a default configuration data or a latest configuration data of the VM, and load the VM according to the retrieved configuration data. If a trigger time of a configuration data has satisfied (e.g., trigger time has met or passed), the VM loader 260 may retrieve the configuration data from the VM configuration data controller 240 and load the VM according to configurations of the VM specified by the retrieved configuration data.

Figure 3A:
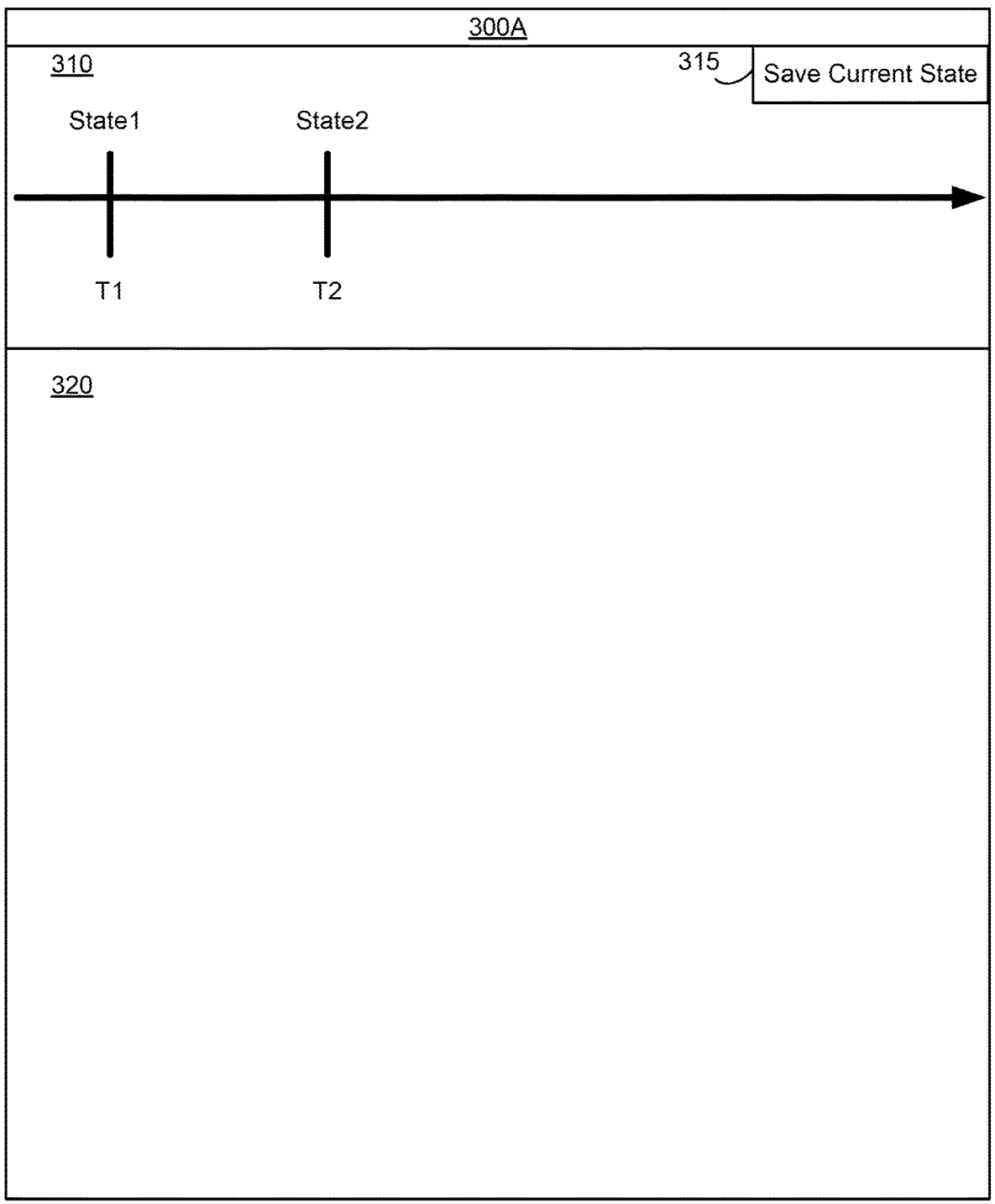
FIGS. 3A through 3C are example user interfaces for storing a state of a virtual machine, in accordance with some embodiments of the present disclosure.

Referring to FIG. 3A, illustrated is an example interface 300A for selecting a state of a VM, in accordance with some embodiments of the present disclosure. In one embodiment, the interface 300A includes a timeline section 310 indicating states of a VM with corresponding times. The interface 300A also includes a VM screen section 320 displaying any content, operation, or both related to VM. Although the timeline section 310 is shown as being on the top of the VM screen section 320, in other embodiments, the timeline section 310 may be positioned at a different location with respect to the VM screen section 320. In some embodiments, the timeline section 310 may be overlaid on the VM screen section 320.

In the example shown in FIG. 3A, the timeline section 310 shows two states State1 and State2 stored at times T1, T2, respectively. The states State1 and State2 may be stored according to a user request generated by the user selecting a save current state button 315. Alternatively, the states State1 and State2 may be automatically stored by the VM server 200 periodically.

Figure 3B:
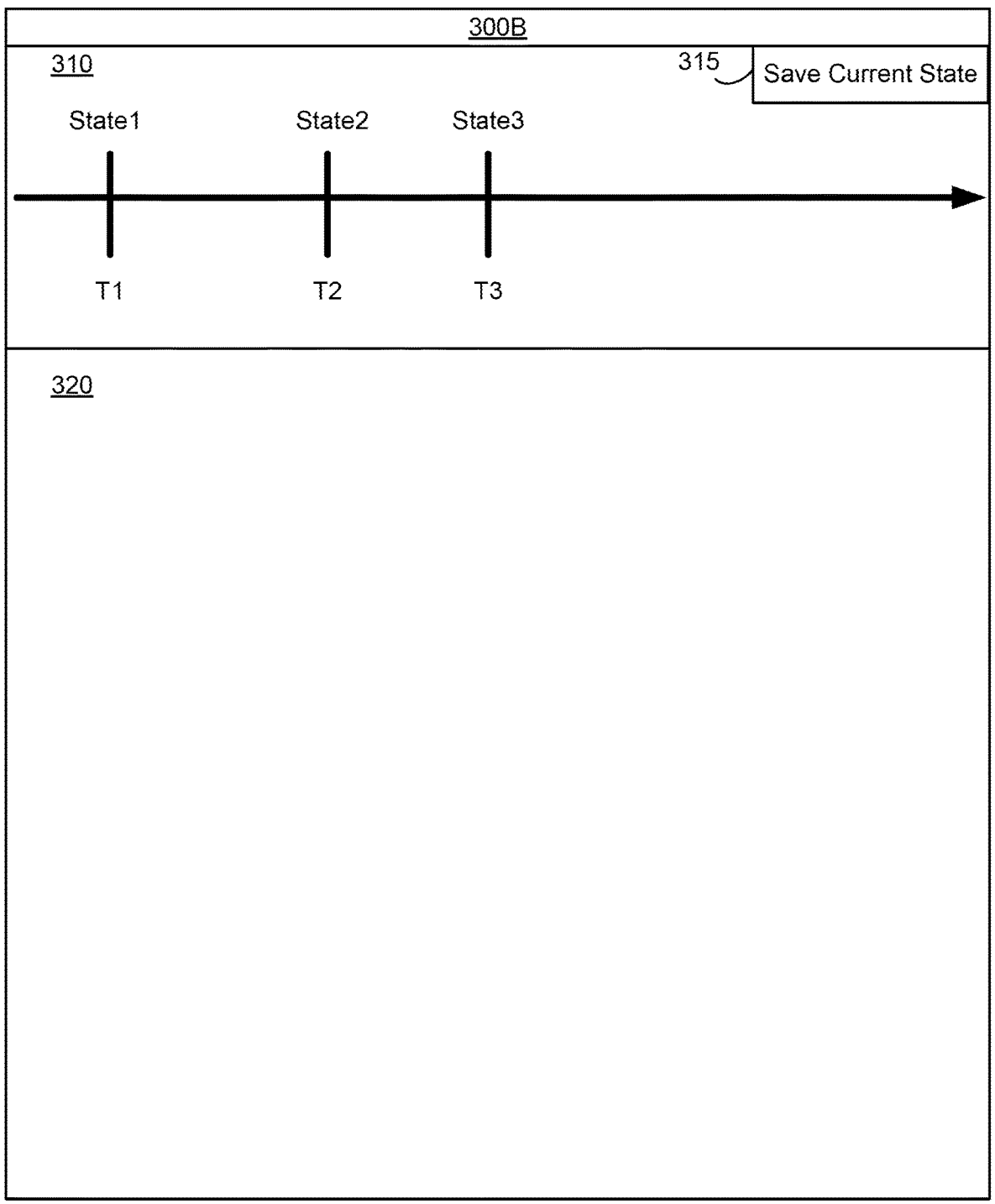

Referring to FIG. 3B, illustrated is an example interface 300B with an additional state State3 compared to the interface 300A shown in FIG. 3A. In FIG. 3B, the state State3 is added at time T3. The state State3 of a VM at time T3 may be added by a user selecting the save current state button 315 at the time T3. Alternatively, the state State3 of the VM may be automatically stored a predetermined time after the time T2 or the time T1, depending on the periodicity of storing the state of the VM.

Figure 3C:
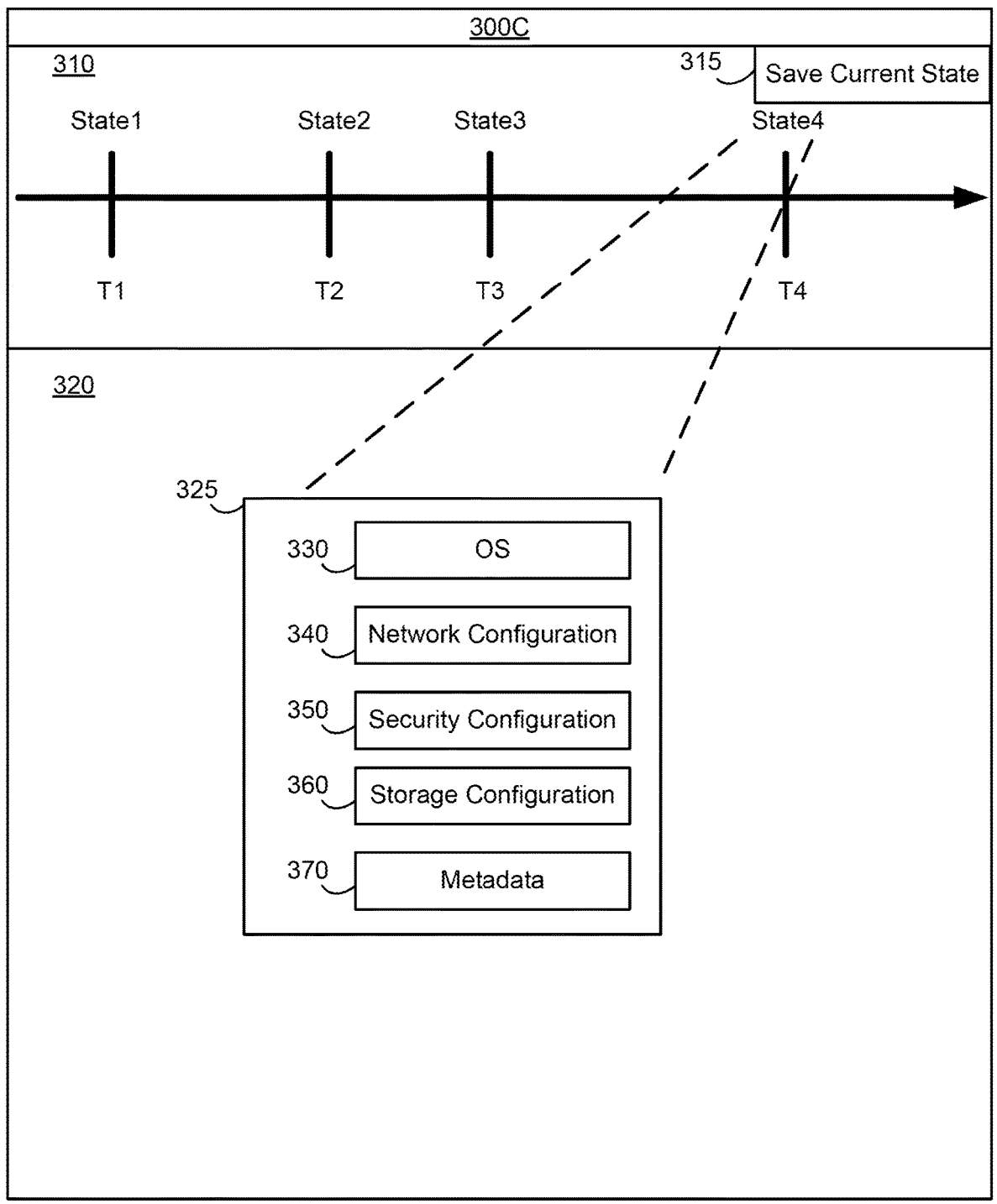

Referring to FIG. 3C, illustrated is an example interface 300C with an additional state State4 compared to the interface 300B shown in FIG. 3B. Assuming that current time is at T3 or between T3 and T4, a user may specify the future state State4 of the VM at time T4 in advance. A user may select a button (not shown) to reserve a future state, or select a desired trigger time (e.g., time T4) on the timeline shown in the timeline section 310. In response to the user selection, a configuration window 325 may be presented to the user. The configuration window 325 allows a user to specify desired configurations of the VM in the future state (e.g., State4) at the trigger time (e.g., T4). For example, a user may specify a target operating system configuration 330, a target network configuration 340, a target security configuration 350, a target storage configuration 360, and any metadata 370 for the VM at the trigger time. Accordingly, the user may set desired configurations of a VM to be applied in the future through the interface 300. Although one future state State4 is shown, the user may set or reserve any number of future states.

Figure 4:
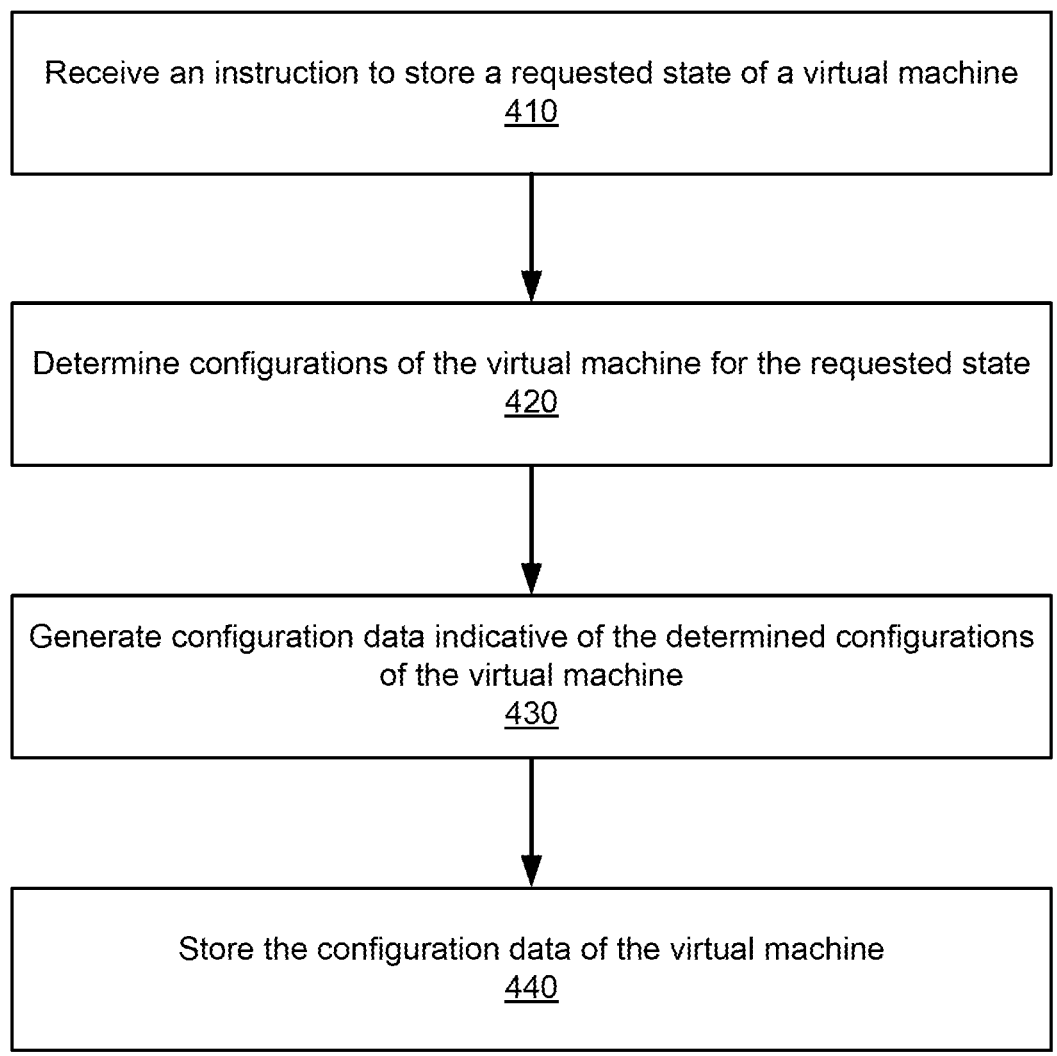
FIG. 4 is an example flowchart showing a process for storing configurations of a virtual machine, in accordance with some embodiments of the present disclosure.

Referring to FIG. 4, illustrated is an example flowchart showing a process 400 for storing configurations of a VM, in accordance with some embodiments of the present disclosure. The process 400 may be performed by the VM server 200. In other embodiments, the process 400 may be performed by other entities. In other embodiments, the process 400 includes more, fewer, or different operations than shown in FIG. 4.

The VM server 200 receives (operation 410) an instruction to store a requested state of a VM. In one approach, the instruction is automatically generated by the VM server 200 to store a state of a VM periodically. In another approach, the instruction is manually generated according to a user request to store a state of a VM at a time when the user makes the request. In another approach, the instruction is generated according to a user request to store a future state of a VM at a time after the user makes the request.

The VM server 200 determines (operation 420) configurations of the VM for the requested state. If the instruction is to store a current state of a VM at a time when the user request is issued, the VM server 200 determines current configurations of the VM at the time. If the instruction is to store a future state of a VM at a trigger time, the VM server 200 may determine future configurations of the VM at the trigger time based on target configurations specified by a user.

The VM server 200 generates (operation 430) configuration data indicative of the determined configurations of the VM and a time associated with the configurations, and stores (operation 440) the configuration data of the VM. The VM server 200 may store the configuration data at a distributed database as key-value pairs.

Figure 5:
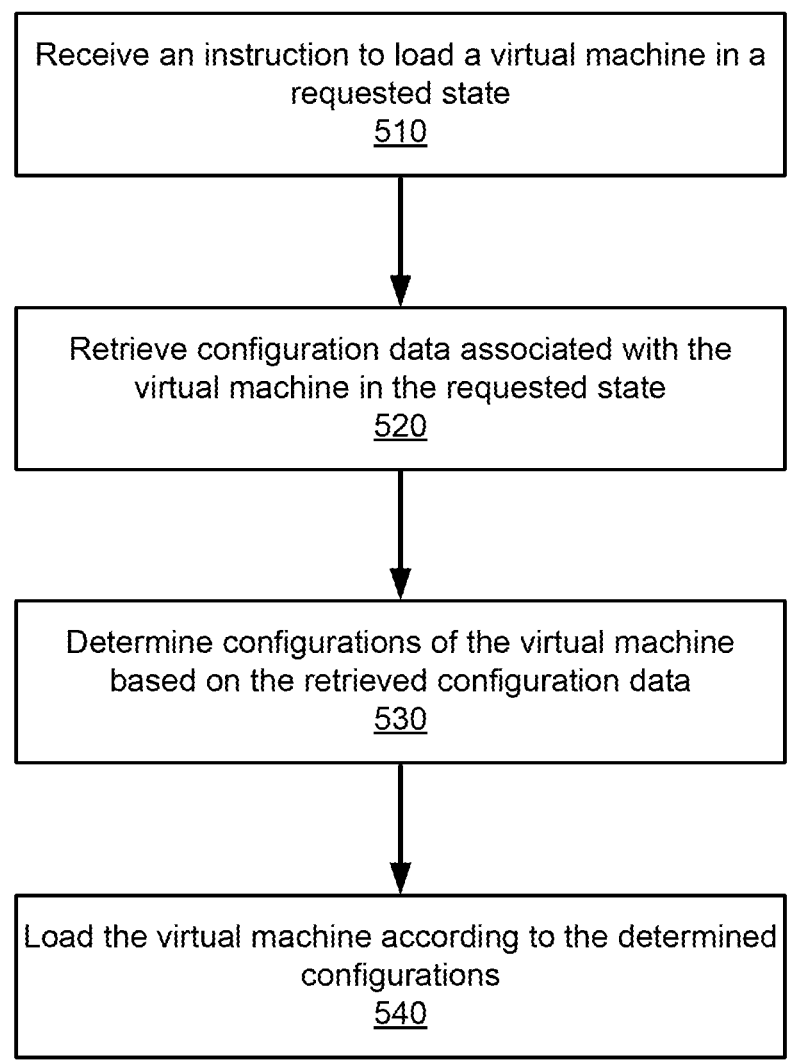
FIG. 5 is an example flowchart showing a process for loading a virtual machine in a particular state from a plurality of states, in accordance with some embodiments of the present disclosure.

Referring to FIG. 5 is an example flowchart showing a process 500 for loading a VM, in accordance with some embodiments of the present disclosure. The process 500 may be performed by the VM server 200. In other embodiments, the process 500 may be performed by other entities. In other embodiments, the process 500 includes more, fewer, or different operations than shown in FIG. 5.

The VM server 200 receives (operation 510) an instruction to load a VM in a requested state, and retrieves (operation 520) a configuration data associated with the VM in the requested state. In one approach, the instruction to load is generated according to a user selection of the requested state of the VM. If no particular state is specified by a user, a default state or a latest state may be the requested state. In another approach, the instruction to load may be automatically generated in response to detecting that the trigger condition has satisfied. For example, in response to detecting that a trigger time has reached or passed, the VM server 200 may automatically retrieve the configuration data of the VM for the trigger time.

The VM server 200 determines (operation 530) configurations of the VM as specified by the retrieved configuration data, and loads (operation 540) the VM according to the determined configurations.

Figure 6:
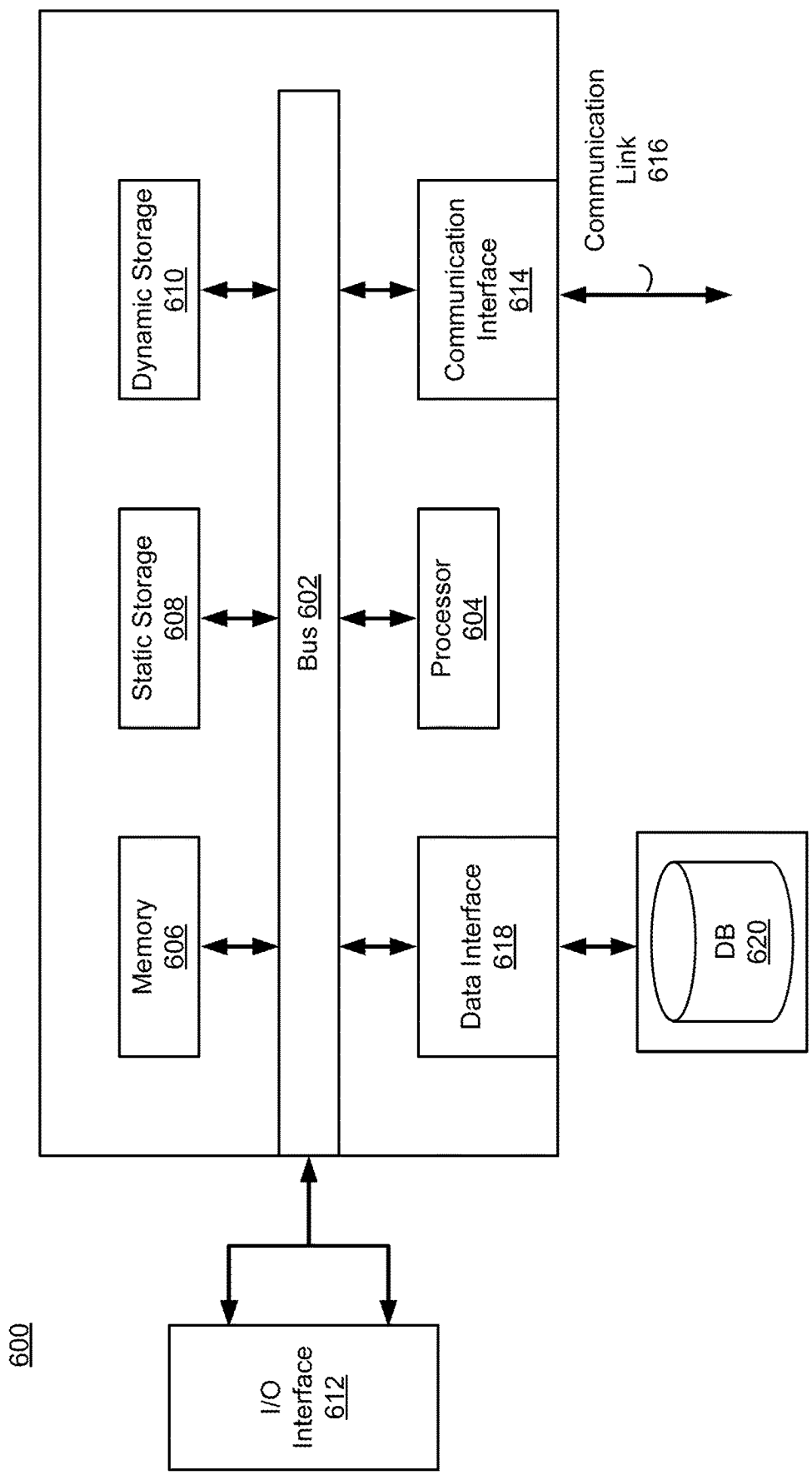
FIG. 6 illustrates a block diagram of a computing system suitable for implementing particular embodiments disclosed herein.

Referring to FIG. 6, illustrated is a block diagram of an illustrative computing system 600 suitable for implementing particular embodiments. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa. Moreover, reference to a computer system may encompass one or more computer systems.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a mainframe, a mesh of computer systems, a server, a laptop or notebook computer system, a tablet computer system, or a combination of two or more of these. Computer system 600 may include one or more computer systems 600; be unitary or distributed; span multiple locations; span multiple machines; span multiple data centers; or reside in a cloud, which may include one or more cloud components in one or more networks. One or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein.

In some embodiments, the computer system 600 includes a bus 602 (e.g., an address bus and a data bus) or other communication mechanism for communicating information, which interconnects subsystems and devices, such as processor 604, memory 606 (e.g., RAM), static storage 608 (e.g., ROM), dynamic storage 610 (e.g., magnetic or optical), communication interface 614 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), input/output (I/O) interface 612 (e.g., keyboard, keypad, mouse, microphone). In particular embodiments, computer system 600 may include one or more of any such components.

In particular embodiments, processor 604 includes hardware for executing instructions, such as those making up a computer program. As an example and not by way of limitation, to execute instructions, processor 604 may retrieve (or fetch) the instructions from an internal register, an internal cache, memory 606, static storage 608, or dynamic storage 610; decode and execute them; and then write one or more results to an internal register, an internal cache, memory 606, static storage 608, or dynamic storage 610. In particular embodiments, processor 604 may include one or more internal caches for data, instructions, or addresses. This disclosure contemplates processor 604 including any suitable number of any suitable internal caches. As an example and not by way of limitation, processor 604 may include one or more instruction caches, one or more data caches, and one or more translation lookaside buffers (TLBs). Instructions in the instruction caches may be copies of instructions in memory 606, static storage 608, or dynamic storage 610, and the instruction caches may speed up retrieval of those instructions by processor 604. Data in the data caches may be copies of data in memory 606, static storage 608, or dynamic storage 610 for instructions executing at processor 604 to operate on; the results of previous instructions executed at processor 604 for access by subsequent instructions executing at processor 604 or for writing to memory 606, static storage 608, or dynamic storage 610; or other suitable data. The data caches may speed up read or write operations by processor 604. The TLBs may speed up virtual-address translation for processor 604. In particular embodiments, processor 604 may include one or more internal registers for data, instructions, or addresses. This disclosure contemplates processor 604 including any suitable number of any suitable internal registers. Processor 604 may include one or more arithmetic logic units (ALUs); be a multi-core processor; or include one or more processors 604. Although this disclosure describes and illustrates a particular processor, this disclosure contemplates any suitable processor.

In particular embodiments, I/O interface 612 includes hardware, software, or both, providing one or more interfaces for communication between computer system 600 and one or more I/O devices. Computer system 600 may include one or more of these I/O devices. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 612 for them. I/O interface 612 may include one or more device or software drivers enabling processor 604 to drive one or more of these I/O devices. I/O interface 612 may include one or more I/O interfaces 612. Although this disclosure describes and illustrates a particular I/O interface, this disclosure contemplates any suitable I/O interface.

In particular embodiments, communication interface 614 includes hardware, software, or both providing one or more interfaces for communication (such as, for example, packet-based communication) between computer system 600 and one or more other computer systems 600 or one or more networks. As an example and not by way of limitation, communication interface 614 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 614 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 614 for any of these networks. Communication interface 614 may include one or more communication interfaces 614. Although this disclosure describes and illustrates a particular communication interface, this disclosure contemplates any suitable communication interface.

One or more memory buses (which may each include an address bus and a data bus) may couple processor 604 to memory 606. Bus 602 may include one or more memory buses, as described below. In particular embodiments, one or more memory management units (MMUs) reside between processor 604 and memory 606 and facilitate accesses to memory 606 requested by processor 604. In particular embodiments, memory 606 includes random access memory (RAM). This RAM may be volatile memory, dynamic RAM (DRAM) or static RAM (SRAM). Moreover, this RAM may be single-ported or multi-ported RAM. This disclosure contemplates any suitable RAM. Memory 606 may include one or more memories 606. Although this disclosure describes and illustrates particular memory, this disclosure contemplates any suitable memory.

The ROM may be mask-programmed ROM, programmable ROM (PROM), erasable PROM (EPROM), electrically erasable PROM (EEPROM), electrically alterable ROM (EAROM), or flash memory or a combination of two or more of these. In particular embodiments, dynamic storage 610 may include a hard disk drive (HDD), a floppy disk drive, flash memory, an optical disc, a magneto-optical disc, magnetic tape, or a Universal Serial Bus (USB) drive or a combination of two or more of these. Dynamic storage 610 may include removable or non-removable (or fixed) media. Dynamic storage 610 may be internal or external to computer system 600. This disclosure contemplates mass dynamic storage 610 taking any suitable physical form. Dynamic storage 610 may include one or more storage control units facilitating communication between processor 604 and dynamic storage 610.

In particular embodiments, bus 602 includes hardware, software, or both coupling components of computer system 600 to each other. As an example and not by way of limitation, bus 602 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 602 may include one or more buses. Although this disclosure describes and illustrates a particular bus, this disclosure contemplates any suitable bus or interconnects.

In some embodiments, computer system 600 performs specific operations by processor 604 executing one or more sequences of one or more instructions contained in memory 606. Such instructions may be read into memory 606 from another computer readable/usable medium, such as static storage 608 or dynamic storage 610. In alternative embodiments, hard-wired circuitry may be used in place of or in combination with software instructions to implement particular embodiments. Thus, particular embodiments are not limited to any specific combination of hardware circuitry and/or software. In particular embodiments, the term "logic" shall mean any combination of software or hardware that is used.

The term "computer readable medium" or "computer usable medium" as used herein refers to any medium that participates in providing instructions to processor 604 for execution. Such a medium may take many forms, including but not limited to, nonvolatile media and volatile media. Non-volatile media includes, for example, optical or magnetic disks, such as static storage 608 or dynamic storage 610. Volatile media includes dynamic memory, such as memory 606.

Common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In particular embodiments, execution of the sequences of instructions may be performed by a single computer system 600; in alternative embodiments, two or more computer systems 600 coupled by communication link 616 (e.g., LAN, PTSN, or wireless network) may perform the sequence of instructions in coordination with one another.

Computer system 600 may transmit and receive messages, data, and instructions, including program, i.e., application code, through communication link 616 and communication interface 614. Received program code may be executed by processor 604 as it is received, and/or stored in static storage 608 or dynamic storage 610, or other non-volatile storage for later execution. A database 620 may be used to store data accessible by the system 600 by way of data interface 618.

Herein, a non-transitory computer readable medium (also referred to as "computer-readable non-transitory storage medium") includes instructions, when executed, cause a processor to execute various functionalities described herein. In some embodiments, a computer-readable non-transitory storage medium or media may be embodied as one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDS), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these. A computer-readable non-transitory storage medium may be volatile, non-volatile, or a combination of volatile and non-volatile.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A non-transitory computer readable medium comprising instructions, when executed by a processor, cause the processor to:
receive an instruction to store a requested state of a desired virtual machine (VM) and a future trigger time for the requested state of the desired VM;
determine target configurations of the desired VM in the requested state at the future trigger time;
generate configuration data indicative of the determined target configurations of the desired VM; and
store the configuration data and the future trigger time; and
at the future trigger time, retrieve the configuration data and load a host machine with a VM having a configuration based on the retrieved configuration data.

2. The non-transitory computer readable medium of claim 1, wherein the future trigger time is a pre-determined time period after a user request time.

3. The non-transitory computer readable medium of claim 1, wherein the requested state of the virtual machine is a state of the virtual machine at which the virtual machine periodically saves the state of the virtual machine.

4. The non-transitory computer readable medium of claim 1, wherein the target configurations are determined at a second time before the future trigger time.

5. The non-transitory computer readable medium of claim 4, further comprising instructions, when executed by the processor, cause the processor to:
receive a user input specifying the target state of the virtual machine at the first time, wherein the configurations of the virtual machine are determined based on the user input.

6. The non-transitory computer readable medium of claim 1, further comprising instructions, when executed by the processor, cause the processor to:
receive another instruction to load the virtual machine in the requested state from a plurality of states of the virtual machine; and
retrieve the stored configuration data indicative of the configurations of the virtual machine in the requested state.

7. The non-transitory computer readable medium of claim 6, further comprising instructions, when executed by the processor, cause the processor to:
identify the configurations of the virtual machine in the requested state based on the retrieved configuration data; and
load the virtual machine in the requested state according to the identified configurations.

8. The non-transitory computer readable medium of claim 7, wherein said another instruction is generated in response to a user selection of the requested state of the virtual machine from the plurality of states.

9. A method comprising:
receiving an instruction to store a requested state of a desired virtual machine (VM) and a future trigger time for the requested state of the desired VM;
determining target configurations of the desired VM in the requested state at the future trigger time;
generating configuration data indicative of the determined target configurations of the desired VM; and
storing the configuration data and the future trigger time; and
at the future trigger time, retrieving the configuration data and loading a host machine with a VM having a configuration based on the retrieved configuration data.

10. The method of claim 9, wherein the requested state of the virtual machine is a state of the virtual machine at which a user requested to save the state of the virtual machine.

11. The method of claim 9, wherein the requested state of the virtual machine is a state of the virtual machine at which the virtual machine periodically saves the state of the virtual machine.

12. The method of claim 9, wherein the target configurations are determined at a second time before the future trigger time.

13. The method of claim 12, further comprising:
receiving a user input specifying the target state of the virtual machine at the first time,
wherein the configurations of the virtual machine are determined based on the user input.

14. The method of claim 9, further comprising:
receiving another instruction to load the virtual machine in the requested state from a plurality of states of the virtual machine; and
retrieving the stored configuration data indicative of the configurations of the virtual machine in the requested state.

15. The method of claim 14, further comprising:
identifying the configurations of the virtual machine in the requested state based on the retrieved configuration data; and
loading the virtual machine in the requested state according to the identified configurations, wherein said another instruction is generated in response to a user selection of the requested state of the virtual machine from the plurality of states.

16. A system comprising:
a processor; and
a non-transitory computer readable medium comprising instructions, when executed by the processor, cause the processor to:
receive an instruction to store a requested state of a desired virtual machine (VM) and a future trigger time for the requested state of the desired VM,
determine target configurations of the desired VM in the requested state at the future trigger time,
generate configuration data indicative of the determined target configurations of the desired VM, and
store the configuration data and the future trigger time; and
at the future trigger time, retrieve the configuration data and load a host machine with a VM having a configuration based on the retrieved configuration data.

17. The system of claim 16, wherein the requested state of the virtual machine is a state of the virtual machine at which a user requested to save the state of the virtual machine.

18. The system of claim 16, wherein the requested state of the virtual machine is a state of the virtual machine at which the virtual machine periodically saves the state of the virtual machine.

19. The system of claim 16, wherein the target configurations are determined at a second time before the future trigger time.

20. The system of claim 19, wherein the non-transitory computer readable medium further comprises instructions, when executed by the processor, cause the processor to:
receive a user input specifying the target state of the virtual machine at the first time,
wherein the configurations of the virtual machine are determined based on the user input.

21. The system of claim 16, wherein the non-transitory computer readable medium further comprises instructions, when executed by the processor, cause the processor to:
- receive another instruction to load the virtual machine in the requested state from a plurality of states of the virtual machine, said another instruction generated in response to a user selection of the requested state of the virtual machine from the plurality of states, and
- retrieve the stored configuration data indicative of the configurations of the virtual machine in the requested state.

22. The system of claim 21, wherein the non-transitory computer readable medium further comprises instructions, when executed by the processor, cause the processor to:
- identify the configurations of the virtual machine in the requested state based on the retrieved configuration data, and
- load the virtual machine in the requested state according to the identified configurations.

* * * * *